United States Patent [19]

Forsythe et al.

[11] 4,269,214

[45] May 26, 1981

[54] SAFETY PRESSURE RELIEF DEVICE

[75] Inventors: Calvin C. Forsythe, Tulsa; John L. Strelow; Miner E. Clift, both of Broken Arrow, all of Okla.

[73] Assignee: BS & B Safety Systems, Inc., Tulsa, Okla.

[21] Appl. No.: 4,809

[22] Filed: Jan. 19, 1979

[51] Int. Cl.³ .................... F16K 17/14; F16K 17/40
[52] U.S. Cl. .............................. 137/68 R; 220/89 A
[58] Field of Search ................. 137/68 R, 69, 70, 71; 220/89 A

[56] References Cited

U.S. PATENT DOCUMENTS

| 3,680,743 | 8/1972 | Reinnagel | 222/397 |
| 3,908,684 | 9/1975 | Short | 137/68 R |
| 4,158,422 | 6/1979 | Witten et al. | 220/89 A |

Primary Examiner—Arnold Rosenthal
Attorney, Agent, or Firm—C. Clark Dougherty, Jr.

[57] ABSTRACT

A safety pressure relief device including a rupture disk having a concave-convex portion and a radially outer flange portion joined by a curved transition connection. An improved knife means is located adjacent the concave side of said rupture disk, said knife means including a radially outer flange portion which supports said curved transition connection. A substantially circular inner opening is disposed in said knife means. Said knife means includes first and second spaced cutting means projecting radially inward into said opening and inclined towards said concave portion of said rupture disk. Said knife means further includes first and second arcuate non-cutting portions each partially defining said inner opening. The first cutting means is located between said first and second non-cutting portions so that upon reversal of said rupture disk said first and second cutting means will puncture said rupture disk without severing a portion of the disk therefrom.

10 Claims, 6 Drawing Figures

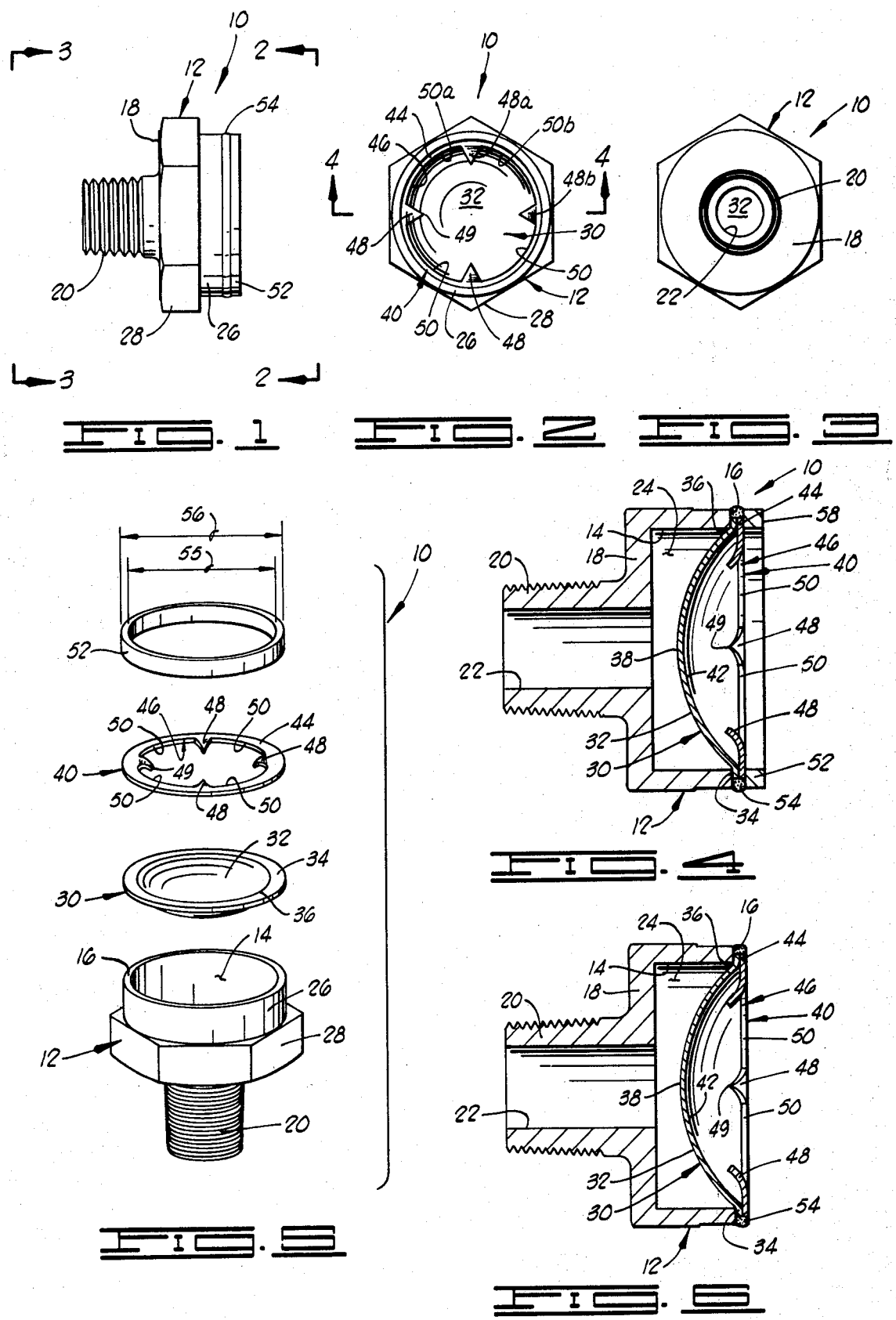

SAFETY PRESSURE RELIEF DEVICE

BACKGROUND OF THE INVENTION

1. Field of the Invention

This invention relates generally to safety pressure relief devices, and more particularly, but not by way of limitation, to a safety pressure relief device including a reverse buckling rupture disk with an improved knife means located adjacent a concave surface of said rupture disk to puncture the rupture disk upon reversal.

2. Description of the Prior Art

The prior art includes a variety of safety pressure relief devices having a reverse buckling rupture disk with a knife means located adjacent the concave side of the rupture disk.

For example, U.S. Pat. No. 3,908,684 to Short shows a reverse buckling rupture disk having a circular axially oriented cutting blade for severing a central circular portion of the rupture disk upon reversal. U.S. Pat. No. 3,294,277 to Wood and U.S. Pat. No. 3,685,686 to Raidl each show a reverse buckling rupture disk having a plurality of connected cutting blades arranged to contact the center of the concave surface of the rupture disk upon reversal so the rupture disk is impaled upon the cutting blades upon reversal. U.S. Pat. No. 3,834,580 to Ludwig et al. discloses a reverse buckling rupture disk having scores thereon with a single knife blade located adjacent the concave surface thereof the puncture the rupture disk upon reversal and cause it to split into a plurality of petals about the preformed score lines.

The present invention provides an improved cutting means which merely punctures the rupture disk upon reversal, in a manner similar to that in which a can opener is used to punch a triangular hole in the top of a beverage can. Such a puncture type rupture of the disk is preferable when only very low flow rates are required and when it is desired to minimize the chance of any material being torn from the disk and blown downstream.

SUMMARY OF THE INVENTION

A safety pressure relief device includes a rupture disk having a concave-convex portion and a radially outer flange portion joined by a curved transition connection. An improved knife means is located adjacent the concave side of said rupture disk, said knife means including a radially outer annular flange portion which supports said curved transition connection. A substantially circular inner opening is disposed in said knife means. Said knife means includes first and second spaced cutting means projecting radially inward into said opening and inclined towards said concave portion of said rupture disk. Said knife means further includes first and second arcuate non-cutting portions each partially defining said inner opening. The first cutting means is located between said first and second non-cutting portions so that upon reversal of said rupture disk, said first and second cutting means will puncture said rupture disk without severing a portion of the disk therefrom.

It is therefore an object of the present invention to provide an improved safety pressure relief device.

Another object of the present invention is the provision of an improved knife means for a safety pressure relief device having a reverse buckling rupture disk with said knife means located adjacent the concave side of said rupture disk.

Yet another object of the present invention is the provision of a rupture disk which provides pressure relief without severing any material which might be blown downstream from the relief device.

Other and further objects, features and advantages of the present invention will be readily apparent to those skilled in the art upon a reading of the description of the preferred embodiments which follows when taken in conjunction with the accompanying drawings.

BRIEF DESCRIPTION OF THE DRAWINGS

FIG. 1 is a side view of the safety pressure relief device of the present invention, showing the outer casing which encloses the rupture disk and knife means.

FIG. 2 is an end view of the safety pressure relief device of FIG. 1 taken about lines 2—2.

FIG. 3 is an end view of the safety pressure relief device of FIG. 1 taken about lines 3—3.

FIG. 4 is a sectional view of the safety pressure relief device of FIG. 2 taken about lines 4—4.

FIG. 5 is an exploded view of the components of the safety pressure relief device of FIG. 1.

FIG. 6 is a view similar to FIG. 4 showing an alternative embodiment of the present invention which does not include an annular outlet ring.

DESCRIPTION OF THE PREFERRED EMBODIMENTS

Referring now to the drawings, the safety pressure relief device of the present invention is shown and generally designated by the numeral 10.

The safety pressure relief device 10 includes casing 12 which has a cylindrical radially inner surface 14. A first end 16 of casing 12 is an open end. A second end of casing 12 is closed by flat wall 18.

Extending axially outward from flat wall 18 is a threaded male pipe connection 20 which has a concentric axial bore 22 therethrough. Axial bore 22 communicates with an inner cavity 24 of casing 12.

A radially outer surface of casing 12 includes a first cylindrical portion 26 adjacent said first open end 16, and a second hex-shaped portion 28 adjacent said second closed wall 18.

Referring now specifically to FIG. 4, the open end 16 of casing 12 engages a rupture disk 30. Rupture disk 30 includes a concave-convex portion 32 and a radially outer flange portion 34 joined by a curved transition connection 36. Open end 16 of casing 12 engages radially outer flange portion 34 of rupture disk 30, with the convex surface 38 of concave-convex portion 32 adjacent said casing 12 and projecting into the inner cavity 24 of casing 12. Due to this construction, the casing 12 protects rupture disk 30 from accidental mechanical damage.

A knife means 40 engages rupture disk 30 adjacent its concave side 42. Knife means 40 includes a radially outer annular flange portion 44 which supports curved transition connection 36. A radially inner edge 46 of annular flange portion 44 defines a substantially circular inner opening in knife means 40.

Knife means 40 further includes a plurality of spaced cutting means or teeth 48 projecting radially inward into said opening from said annular flange 44. Between adjacent teeth 48 there is a continuous arcuate non-cutting portion 50, so that upon reversal of said rupture disk, said teeth will puncture said rupture disk without severing any portion of the rupture disk from the rupture disk.

Knife means 40 can more generally be described, referring to FIG. 2, as including first and second spaced cutting means 48a and 48b, respectively. First and second cutting means 48a and 48b are said to be "spaced" because they are separated by a non-cutting portion 50b and because they are not connected other than by their common connection to flange portion 44. Although each of the cutting means 48 shown in FIG. 2 includes only one tooth, a cutting means 48 could include two or more non-spaced teeth. Knife means 40 further includes first and second non-cutting portions 50a and 50b, respectively, each of which partially define said inner opening in knife means 40. First cutting means 48a is located between said first and second non-cutting portions 50a and 50b, so that upon reversal of said rupture disk 30, said first and second cutting means 48a and 48b will puncture said rupture disk 30 without severing a portion of rupture disk 30 therefrom.

Said triangular teeth 48 each have one side of said triangle engaging radially inner edge 46, with a corner 49 of said triangle 48 projecting radially inward. Preferably, the teeth 48 are integrally formed with annular ring 44 from a single sheet of initially flat metal. An inner portion of the flat metal sheet is punched out leaving the teeth 48 and the arcuate non-cutting edges 50. Then, the teeth 48 are bent so that they are inclined toward concave surface 42 of rupture disk 30.

Teeth 48 are inclined at an angle in the range of about 25° to 40° from the plane of said annular ring 44. Preferably, teeth 48 are inclined at an angle which is substantially tangential to a pre-rupture position of a point of said rupture disk 30 engaged by said radially inner corner 49 of one of said teeth 48 upon reversal of concave-convex portion 32.

A preferred embodiment of the present invention includes four teeth 48 angularly spaced 90° apart with four continuous arcuate non-cutting portions 50 of radially inner edge 46 separating the four teeth 48. The four teeth 48 are equally angularly spaced about the radially inner edge 46.

Adjacent a side of the annular flange portion 44 of knife means 40, opposite rupture disk 30 is an annular outlet ring 52. Outlet ring 52 is connected to cylindrical portion 26 of casing 12 by a continuous annular heli-arc weld as indicated at 54. Weld 54 also welds rupture disk 30 and knife means 40 to casing 12. The continuous weld between rupture disk 30 and casing 12 prevents leakage of fluid between rupture disk 30 and casing 12.

An inner diameter 55 and an outer diameter 56 of outlet ring 52 are substantially equal to an inner and an outer diameter, respectively, of cylindrical portion 26 of casing 12.

FIG. 5 shows an exploded view of the components of safety pressure relief device 10 before they are assembled and before outlet ring 52 is welded to casing 12.

FIG. 6 illustrates an alternative embodiment of the present invention which does not include an annular outlet ring 52. In the embodiment of FIG. 6, the flange portion 34 of rupture disk 30 and the annular flange portion 44 of knife means 40 are both continuously welded to casing 12 at 54.

A typical embodiment of the safety pressure relief device 10 of the present invention is designed so that threaded connection 20 is engaged with a pressure vessel having a high vacuum therein. An open end 58 of outlet ring 52 is typically open to the outside ambient air pressure. If for some reason the vacuum inside the pressure vessel is lost and some positive pressure, above a predetermined reversal pressure differential, builds up within the pressure vessel, then the concave-convex portion 32 of rupture disk 30 will reverse, thereby causing four triangular shaped holes to be cut in concave-convex portion 32 by the four teeth 48. The excess pressure inside the pressure vessel then may escape to the outside of the vessel through the four triangular holes in rupture disk 30.

Generally, the rupture disk 30 is designed for reversal at low pressure differentials. The safety pressure relief device 10 is preferably used in those applications where the required discharge flow rate is relatively low and there is no need for a full opening rupture disk. The four holes are punched in the rupture disk 30 in much the same manner that a can opener is used to punch a triangular hole in the top of a beverage can. None of the material of the rupture disk is completely severed therefrom, therefore there is no problem with material from the rupture disk being torn away and blown downstream. Due to the fact that the teeth 48 are inclined towards concave surface 42, the rupture disk 30 is punctured more rapidly upon reversal than it would be if teeth 48 were not so inclined. Also, the inclination of teeth 48 provides for less obstruction by the teeth 48 of flow through the triangular puncture holes.

Thus, the safety pressure relief device of the present invention is well adapted to carry out the objects and attain the ends and advantages mentioned as well as those inherent therein. While presently preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. A safety pressure relief device for permitting excess pressure to escape from a pressure vessel, said device comprising:
   a reverse buckling rupture disk having a concave-convex portion and a radially outer flange portion joined by a curved transition connection;
   a casing including:
      a first end portion;
      a second end portion;
      a wall disposed adjacent said second end portion so that an inner cavity is defined within said casing between said first and said second end portions, said radially outer flange of said rupture disk engaging said first end portion with a convex side of said rupture disk adjacent said casing so that said concave-convex portion projects into said inner cavity; and
      connecting means projecting axially outward from said wall for engaging the pressure vessel, said connecting means having an axial bore disposed therethrough communicating with said inner cavity so that the pressure in the pressure vessel is communicated to said rupture disk; and
   knife means positioned adjacent a concave side of said rupture disk, said knife means including:
      a radially outer flange portion supporting said curved transition connection of said rupture disk;
      a radially inner opening disposed in said knife means;

first cutting means projecting radially inward into said opening from said outer flange portion of said knife means, said first cutting means including a first substantially triangular shaped tooth;

second cutting means projecting radially inward into said opening from said outer flange portion of said knife means, said second cutting means including a second substantially triangular shaped tooth spaced from said first substantially triangular shaped tooth; and first and second non-cutting portions, each of said non-cutting portions partially defining said inner opening, said first cutting means being located between said first and second non-cutting portions so that upon reversal of said rupture disk in response to excess pressure in the pressure vessel said first and second cutting means puncture said rupture disk thereby permitting excess pressure to escape from the vessel.

2. Apparatus of claim 1 wherein:
said inner opening is substantially circular; and
said non-cutting portions are arcuate.

3. Apparatus of claim 1 wherein:
said first and second cutting means are each integrally formed with said flange portion of said knife means.

4. Apparatus of claim 1 wherein:
said first and second cutting means are inclined toward said concave-convex portion of said rupture disk.

5. Apparatus of claim 4 wherein:
said first and second cutting means are inclined at an angle in the range of about 25° to 40° from a plane of said flange portion of said knife means.

6. Apparatus of claim 4 wherein:
said first and second cutting means are inclined at an angle substantially tangential to a pre-rupture position of a point of said rupture disk engaged by a radially inner part of one of said first and second cutting means upon reversal of said rupture disk.

7. Apparatus of claim 1 further comprising:
an annular outlet ring, engaging a side of the flange portion of said knife means opposite said rupture disk, said outlet ring being connected to said casing to retain said rupture disk and knife means in place therein.

8. Apparatus of claim 7 wherein:
said outlet ring and casing are welded together; and
said flange portion of said rupture disk is continuously welded to said casing to prevent leakage of fluid between said rupture disk and said casing.

9. Apparatus of claim 1 wherein:
said flange portion of said rupture disk is continuously welded to said casing to prevent leakage of fluid between said rupture disk and said casing.

10. A safety pressure relief device for permitting excess pressure to escape from a pressure vessel, said device comprising:

a reverse buckling rupture disk having a concave-convex portion and a radially outer flange portion joined by a curved transition connection;

a casing, including:
an open end;
a cylindrical portion adjacent said open end;
a polygonally shaped portion adjacent said cylindrical portion;
a closed end adjacent said polygonally shaped portion;
a wall closing said second end so that an inner cavity is defined between said first end and said second end said radially outer flange portion of said rupture disk engaging said open end with a convex side of said rupture disk adjacent said casing so that said concave-convex portion projects into said inner cavity; and
threaded connecting means projecting axially outward from said wall for engaging the pressure vessel, said threaded connecting means having an axial bore disposed therethrough communicating with said inner cavity so that the pressure in the pressure vessel is communicated to the convex side of said rupture disk; and knife means positioned adjacent a concave side of said rupture disk, said knife means including:
a radially outer flange portion supporting said curved transition connection of said rupture disk;
a radially inner opening defined by a radially inner edge of said outer flange portion of said knife means;
a first substantially triangular shaped tooth projecting radially inward into said inner opening from said outer flange portion of said knife means and at an inclination toward the concave side of said rupture disk;
a second substantially triangular shaped tooth projecting radially inward into said inner opening from said outer flange portion of said knife means and at an inclination toward the concave side of said rupture disk;
a first non-cutting portion extending arcuately along the inner edge of said outer flange portion of said knife means between a first side of said first tooth and a first side of said second tooth; and
a second non-cutting portion extending arcuately along the inner edge of said outer flange portion of said knife means between a second side of said first tooth and a second side of said second tooth so that said first and second teeth are spaced from each other and respectively make single punctures in said rupture disk without severing a portion of said rupture disk when said rupture disk is subjected to excessive pressure from the pressure vessel.

* * * * *